(12) United States Patent
Kim et al.

(10) Patent No.: US 8,912,289 B2
(45) Date of Patent: Dec. 16, 2014

(54) TAPERED ASYMMETRIC BLOCK COPOLYMERS AND ADHESIVES COMPOSITION COMPRISING THE SAME

(75) Inventors: Jae Yun Kim, Daejeon (KR); Min Sung Kwon, Daejeon (KR); Eun Kyung Noh, Daejeon (KR)

(73) Assignee: Korea Kumho Petrochemical Co., Ltd. (KR)

( * ) Notice: Subject to any disclaimer, the term of this patent is extended or adjusted under 35 U.S.C. 154(b) by 197 days.

(21) Appl. No.: 13/040,329

(22) Filed: Mar. 4, 2011

(65) Prior Publication Data

US 2012/0149826 A1    Jun. 14, 2012

(30) Foreign Application Priority Data

Dec. 14, 2010   (KR) .................. 10-2010-0127914

(51) Int. Cl.
*C08F 297/02* (2006.01)
*C08F 299/02* (2006.01)
*C09J 153/02* (2006.01)

(52) U.S. Cl.
CPC .............. *C08F 297/02* (2013.01); *C08F 299/02* (2013.01); *C09J 153/02* (2013.01)
USPC .......................................... 525/314; 524/505

(58) Field of Classification Search
CPC ...... C09J 153/02; C08F 297/02; C08F 299/02
USPC .......................................... 525/314; 524/505
See application file for complete search history.

(56) References Cited

U.S. PATENT DOCUMENTS

| | | |
|---|---|---|
| 3,265,765 A | 8/1966 | Holden |
| 4,163,764 A | 8/1979 | Nash |
| 4,335,221 A | 6/1982 | Gerberding |
| 4,603,155 A | 7/1986 | Muramori |
| 4,874,821 A | 10/1989 | Agostinis |
| 5,227,419 A * | 7/1993 | Moczygemba et al. ...... 524/128 |
| 5,554,697 A | 9/1996 | Van Dijk |
| 2002/0037962 A1* | 3/2002 | Lechtenbohmer et al. ..... 525/88 |
| 2008/0051510 A1* | 2/2008 | Toney et al. .................... 525/89 |

FOREIGN PATENT DOCUMENTS

| | | |
|---|---|---|
| KP | 1020060110892 | 10/2006 |
| KP | 1020070083599 | 8/2007 |

OTHER PUBLICATIONS

Rameshwar Adhikari "Correlations Between Molecular Architecture, Morphology and Deformation Behavior of Styrene/Butadiene Block Copolymers and Blends" Dissertation, Universitäts-und Landesbibliothek, 2001.*

* cited by examiner

*Primary Examiner* — Mark Kaucher
(74) *Attorney, Agent, or Firm* — Mayback & Hoffman, P.A.; Gregory L. Mayback

(57) ABSTRACT

Provided is a tapered block copolymer having asymmetric vinyl aromatic blocks. The disclosed tapered block copolymer has very superior adhesion properties such as loop tack, 180° peel strength and softening point and may be used to prepare high-quality hot melt adhesives for industrial use.

16 Claims, No Drawings

TAPERED ASYMMETRIC BLOCK COPOLYMERS AND ADHESIVES COMPOSITION COMPRISING THE SAME

CROSS-REFERENCE TO RELATED APPLICATIONS

This application claims priority under 35 U.S.C. §119 to Korean Patent Application No. 10-2010-0127914, filed on Dec. 14, 2010, in the Korean Intellectual Property Office, the disclosure of which is incorporated herein by reference in its entirety.

STATEMENT REGARDING FEDERALLY SPONSORED RESEARCH OR DEVELOPMENT

Not Applicable

FIELD OF THE INVENTION

The present invention relates to an adhesive composition including tapered asymmetric block copolymers.

BACKGROUND OF THE INVENTION

Physical properties of an adhesive may be evaluated in terms of tack, adhesion and cohesion. These properties are affected by the kind of monomers, molecular weight, molecular weight distribution, and additives. Among them, tack and adhesion increase as the molecular weight is smaller and as the glass transition temperature ($T_g$) is lower, i.e., as the adhesive is more flexible. In contrast, cohesion and holding power increase as the molecular weight is larger, i.e., as the secondary binding force is larger. Cohesion is an intermolecular attraction. A high cohesion results in an interfacial fracture of the adhesive during debonding, whereas a low cohesion will lead to a cohesive fracture, leaving fractured adhesive residue on the adherend. Thus, it is crucial to improve adhesion properties while causing an interfacial fracture.

Adhesive compositions including styrene-based block copolymers as main thermoplastic elastomer components are widely used as pressure sensitive adhesives for industrial tapes, packaging tapes and labels, and as hot melt adhesives for diapers, feminine hygiene products, or the like. Usually, poly(styrene)-poly(isoprene)-poly(styrene) (SIS) block copolymers and poly(styrene)-poly(butadiene)-poly(styrene) (SBS) block copolymers are commonly used as those adhesive composition.

Unlike the SBS block copolymers for other applications wherein the mechanical properties of them are required above all, processing properties such as viscosity and adhesion properties after manufacture are important for the SBS block copolymers used in adhesives. Thus, the first considerations when preparing adhesives using the SBS block copolymers have good compatibility with other materials such as adhesive resins, plasticizers (oils), etc., good heat resistance and low viscosity in view of processing. And, with regard to the adhesion properties, loop tack, 180° peel strength, holding power, or the like are also important. These properties are affected by the molecular structure and molecular weight of the SBS block copolymers.

U.S. Pat. No. 3,265,765 describes that a hot melt adhesive may be prepared using the linear SBS triblock copolymer. Although thus prepared triblock copolymer may have superior holding power, it does not have good processing properties or adhesion properties.

U.S. Pat. No. 4,163,764 discloses linear or radial SBS block copolymers prepared using various coupling agents for use as hot melt adhesive. Thus prepared SBS block copolymers have improved processing properties, but their adhesion properties are not considerably different from other similar linear SBS triblock copolymers. Therefore, for improvement of the processing properties and adhesion properties, adhesives including tapered block copolymers in part have been introduced.

U.S. Pat. No. 4,603,155 discloses a multiblock copolymer of a structure styrene-butadiene/styrene-butadiene/styrene-butadiene-styrene, with the butadiene block at the center portion having two or more taper blocks.

U.S. Pat. No. 4,874,821 discloses a styrene/butadiene-styrene-butadiene block copolymer, with the styrene/butadiene block being tapered.

U.S. Pat. No. 5,554,697 discloses a preparation method for a styrene1-butadiene/styrene2-styrene3 block copolymer by adding styrene to be included in the styrene2 and styrene3 blocks at once at a specific transition ratio of butadiene, and an adhesive composition relating thereto.

Of the above described copolymers, those having multiple taper blocks have superior processing properties and adhesion properties. However, their polymerization time increases considerably while their softening point of the adhesive drops considerably as the taper content increases. Further, the addition of styrene at a specific transition ratio of butadiene is different from the addition of a predetermined amount of styrene to be tapered and has difficulty in stably producing the block copolymer with controlled content and size of the tapered styrene blocks. Thus, the existing methods are restricted in satisfying both producibility and quality for commercial application.

SUMMARY OF THE INVENTION

The present invention is directed to providing a tapered asymmetric block copolymer and an adhesive composition including the tapered asymmetric block copolymer, which has superior adhesion properties such as loop tack, 180° peel strength and softening point.

In one general aspect, the present invention provides a block copolymer represented by Chemical Formula 1:

$$A_1\text{-}(A_2/B)\text{-}A_3 \quad (1)$$

wherein $A_1$ and $A_3$ are vinyl aromatic block polymers; $A_2$ is a vinyl aromatic monomer; B is a conjugated diene monomer; ($A_2$/B) is a tapered block copolymer copolymerized from $A_2$ and B; and the block size of $A_1$ is different from the block size of $A_3$.

With the block size of $A_1$ being different from the block size of $A_3$ unlike the existing block copolymers, the presently disclosed block copolymer may be used to provide an adhesive with superior loop tack, 180° peel strength, holding power, or the like.

In another general aspect, the present invention provides a method for preparing the block copolymer represented by Chemical Formula 1.

In another general aspect, the present invention provides an adhesive composition including the block copolymer represented by Chemical Formula 1.

DETAILED DESCRIPTION OF THE INVENTION

Hereinafter, reference will now be made in detail to various embodiments of the present invention. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present invention provides a block copolymer represented by Chemical Formula 1:

$$A_1\text{-}(A_2/B)\text{-}A_3 \qquad (1)$$

wherein $A_1$ and $A_3$ are vinyl aromatic block polymers; $A_2$ is a vinyl aromatic monomer; B is a conjugated diene monomer; $(A_2/B)$ is a tapered block copolymer copolymerized from $A_2$ and B; and the block size of $A_1$ is different from the block size of $A_3$.

With the block size of $A_1$ being different from the block size of $A_3$ unlike the existing block copolymers, the disclosed block copolymer may be used to provide an adhesive with superior loop tack, 180° peel strength, holding power, or the like.

In the present invention, the block size refers to the number of repeating blocks.

More specifically, a ratio of the block sizes of $A_1$ and $A_3$ may be 1:1.1-8. The block size of $A_1$ may be larger than that of $A_3$. In this case, a ratio of the block sizes of $A_3$ and $A_1$ may be 1:1.1-8. If the block sizes are the same, softening point, tack, etc., of the adhesive may be unsatisfactory as compared to when the block sizes are different. On the contrary, if the ratio exceeds 1:8, mechanical properties of the block copolymer itself are degraded considerably because the difference in the block size is too large. Further, tack, adhesion, softening point, or the like may be unsatisfactory because of considerably reduced compatibility with the adhesive resin. More specifically, the ratio of the block sizes of $A_1$ and $A_3$ or the block sizes of $A_3$ and $A_1$ may be 1:2-5. Specifically, the proportion of $A_2$ may be 5-50 wt % of the total vinyl aromatic monomers $(A_1+A_2+A_3)$. If the proportion of $A_2$ is less than 5% of the total vinyl aromatic monomers, compatibility with the adhesive resin may be degraded. And, if it is more than 50%, holding power, softening point, etc. of the adhesive may be unsatisfactory for industrial application, because of relatively low weight contents of $A_1$ and $A_3$. More specifically, the proportion of $A_2$ may be 10-30 wt %.

The vinyl aromatic monomer may be selected from the group consisting of styrene, α-methylstyrene, p-methylstyrene, o-methylstyrene, p-tert-butylstyrene, dimethylstyrene, vinyltoluene, vinylxylene, diphenylethylene and vinylnaphthalene.

The vinyl aromatic polymer may be a polymer or a copolymer of monomers selected from the group consisting of styrene, α-methylstyrene, p-methylstyrene, o-methylstyrene, p-tert-butylstyrene, dimethylstyrene, vinyltoluene, vinylxylene, diphenylethylene and vinylnaphthalene.

And, the conjugated diene monomer may be butadiene, isoprene or a mixture thereof.

The block copolymer may have a weight average molecular weight from 10,000 to 200,000, more specifically from 20,000 to 100,000.

The content of the vinyl aromatic monomers in the block copolymer may be 5-95 wt %.

The copolymer represented by Chemical Formula 1 may be prepared according to a triblock copolymer polymerization process, comprising: polymerizing a vinyl aromatic monomer ($A_1$) in an inert hydrocarbon organic solvent using an organolithium initiator (step 1); upon completion of the polymerization, adding a conjugated diene monomer and a vinyl aromatic monomer ($A_2$) together and performing polymerization (step 2); and adding a vinyl aromatic monomer ($A_3$) and performing polymerization, and then deactivating the active terminals of polymers using a polymerization terminator (step 3). In such a triblock copolymer, the block size of A1 and A3 is proportional to the amount of each vinyl aromatic monomer added in each step. And, the proportion of A2 can be easily controlled by adjusting its addition amount since it is also proportional thereto. Specifically, a molar ratio of $A_1$ to $A_3$ or $A_3$ to $A_1$ may be 1:1.1-8. And, specifically, the weight proportion of $A_2$ may be 5-50 wt % of the total vinyl aromatic monomers $A_1+A_2+A_3$.

Each polymerization step in the aforesaid process may be performed either under constant-temperature condition or under adiabatic condition. The reaction may be performed at a temperature of from −10 to 150° C., specifically from 10 to 110° C.

During the polymerization, a small amount of Lewis base may be used for improvement of reaction speed and control of the vinyl content. The Lewis base may be an ether such as tetrahydrofuran, diethyl ether, diethylene glycol dimethyl ether, etc., a tertiary amine such as N,N,N',N'-tetramethylethylenediamine, triethylamine, etc., or a mixture thereof.

The organic solvent may be hexane, heptane, cyclohexane, benzene, toluene, etc., and the organolithium initiator may be n-butyllithium, sec-butyllithium, etc.

The polymerization terminator used to terminate the polymerization may be a commonly used anionic polymerization terminator such as water, alcohols, organic/inorganic acids, halogenated Group 4 compounds, or the like.

The present invention also provides an adhesive composition comprising the block copolymer represented by Chemical Formula 1.

Specifically, the adhesive composition may further comprise, in addition to the block copolymer, an adhesive resin, a plasticizer and a stabilizer.

The adhesive resin may be selected from the group consisting of an aliphatic hydrocarbon resin, a modified $C_5$ hydrocarbon resin ($C_5/C_9$ resin), a styrene-modified terpene resin, a fully or partly hydrogenated $C_9$ hydrocarbon resin, hydrogenated cycloaliphatic hydrocarbon resin, a hydrogenated aromatic-modified cycloaliphatic hydrocarbon resin and a mixture thereof. Specifically, a solid adhesive resin having a softening point of 90-105° C. and an aromatic compound content of 0-16%, more specifically 0-12%, may be used.

The adhesive resin may be comprised in an amount of 100-400 parts by weight, more specifically 100-300 parts by weight, based on 100 parts by weight of the block copolymer represented by Chemical Formula 1.

The plasticizer may be a paraffinic or naphthenic plasticizer oil with an aromatic carbon distribution being 5% or less, more specifically 2% or less, and having a glass transition temperature ($T_g$) measured by differential scanning calorimetry (DSC) of −55° C. or below. Specifically, a low molecular weight (30,000 g/mol or less) polymer such as an olefin oligomer, a liquid polybutene, a liquid polyisoprene copolymer, a liquid styrene-isoprene copolymer or a liquid hydrogenated styrene-conjugated diene copolymer, a vegetable oil and its derivatives, paraffin, microcrystalline wax, or the like may be used.

In the adhesive composition of the present invention, the plasticizer may be comprised in an amount of 10-200 parts by weight, more specifically 50-150 parts by weight, based on 100 parts by weight of the block copolymer represented by Chemical Formula 1.

In general adhesive compositions, a stabilizer is used in an amount of 0.1-10 parts by weight, more specifically 0.1-1 part by weight, based on 100 parts by weight of the block copolymer represented by Chemical Formula 1, in order to improve heat resistance and color of the adhesive. Also in the present invention, a hindered phenol, a phosphite derivative or a combination thereof may be used as the stabilizer.

A detailed description about the method for preparing the adhesive composition will be omitted since it is the same as that commonly used to prepare adhesives.

EXAMPLES

The examples and experiments will now be described. The following examples and experiments are for illustrative purposes only and not intended to limit the scope of this disclosure.

Examples

Synthesis of Tapered Asymmetric Block Copolymers

Example 1

Cyclohexane (2400 g), tetrahydrofuran (0.36 g) and styrene (88 g) were added to a 5-L stainless steel reactor under nitrogen atmosphere. Then, n-butyllithium (7.0 mmol) was added to the reactor at 30° C. and reaction was performed while heating adiabatically. Ten minutes after the reaction temperature reached the maximum, butadiene (240 g) and styrene (16 g) were added simultaneously and then reaction was carried out. Ten minutes after the reaction temperature reached the maximum, styrene (56 g) was added and then reaction was carried out. Methanol (6.7 mmol) was added to terminate the reaction and Irganox 1076 (Ciba Specialty Chemicals) and tris(nonylphenyl)phosphite (TNPP) (0.3 phr each) were added as antioxidant.

GPC analysis revealed that a styrene-butadiene/styrene-styrene block copolymer ($A_1$-($A_2$/B)-$A_3$) having a weight average molecular weight of 61,000 and a molecular weight distribution (MWD) of 1.021 was prepared. H-NMR revealed a styrene content of 40.1 wt %.

Example 2

Cyclohexane (2400 g), tetrahydrofuran (0.36 g) and styrene (104 g) were added to a 5-L stainless steel reactor under nitrogen atmosphere. Then, n-butyllithium (7.0 mmol) was added to the reactor at 30° C. and reaction was performed while heating adiabatically. Ten minutes after the reaction temperature reached the maximum, butadiene (240 g) and styrene (16 g) were added simultaneously and then reaction was carried out. Twenty minutes after the reaction temperature reached the maximum, styrene (40 g) was added and then reaction was carried out. Methanol (6.7 mmol) was added to terminate the reaction and Irganox 1076 and TNPP (0.3 phr each) were added as antioxidant.

GPC analysis revealed that a styrene-butadiene/styrene-styrene block copolymer ($A_1$-($A_2$/B)-$A_3$) having a weight average molecular weight of 61,000 and a molecular weight distribution (MWD) of 1.021 was prepared. H-NMR revealed a styrene content of 39.8 wt %.

Example 3

Cyclohexane (2400 g), tetrahydrofuran (0.36 g) and styrene (120 g) were added to a 5-L stainless steel reactor under nitrogen atmosphere. Then, n-butyllithium (7.0 mmol) was added to the reactor at 30° C. and reaction was performed while heating adiabatically. Ten minutes after the reaction temperature reached the maximum, butadiene (240 g) and styrene (16 g) were added simultaneously and then reaction was carried out. Twenty minutes after the reaction temperature reached the maximum, styrene (24 g) was added and then reaction was carried out. Methanol (6.7 mmol) was added to terminate the reaction and Irganox 1076 and TNPP (0.3 phr each) were added as antioxidant.

GPC analysis revealed that a styrene-butadiene/styrene-styrene block copolymer ($A_1$-($A_2$/B)-$A_3$) having a weight average molecular weight of 60,000 and a molecular weight distribution (MWD) of 1.025 was prepared. H-NMR revealed a styrene content of 40.2 wt %.

Example 4

Cyclohexane (2400 g), tetrahydrofuran (0.36 g) and styrene (96 g) were added to a 5-L stainless steel reactor under nitrogen atmosphere. Then, n-butyllithium (7.0 mmol) was added to the reactor at 30° C. and reaction was performed while heating adiabatically. Ten minutes after the reaction temperature reached the maximum, butadiene (240 g) and styrene (32 g) were added simultaneously and then reaction was carried out. Twenty minutes after the reaction temperature reached the maximum, styrene (32 g) was added and then reaction was carried out. Methanol (6.7 mmol) was added to terminate the reaction and Irganox 1076 and TNPP (0.3 phr each) were added as antioxidant.

GPC analysis revealed that a styrene-butadiene/styrene-styrene block copolymer ($A_1$-($A_2$/B)-$A_3$) having a weight average molecular weight of 61,000 and a molecular weight distribution (MWD) of 1.029 was prepared. H-NMR revealed a styrene content of 40.1 wt %.

Comparative Examples

Synthesis of tapered symmetric block copolymers

Comparative Example 1

Cyclohexane (2400 g), tetrahydrofuran (0.36 g) and styrene (72 g) were added to a 5-L stainless steel reactor under nitrogen atmosphere. Then, n-butyllithium (7.0 mmol) was added to the reactor at 30° C. and reaction was performed while heating adiabatically. Ten minutes after the reaction temperature reached the maximum, butadiene (240 g) and styrene (16 g) were added simultaneously and then reaction was carried out. Ten minutes after the reaction temperature reached the maximum, styrene (72 g) was added and then reaction was carried out. Methanol (6.7 mmol) was added to terminate the reaction and Irganox 1076 and TNPP (0.3 phr each) were added as antioxidant.

GPC analysis revealed that a styrene-butadiene/styrene-styrene block copolymer (A1-(B/A2)-A3) having a weight average molecular weight of 61,000 and a molecular weight distribution (MWD) of 1.025 was prepared. H-NMR revealed a styrene content of 40.3 wt %.

Comparative Example 2

Cyclohexane (2400 g), tetrahydrofuran (0.36 g) and styrene (64 g) were added to a 5-L stainless steel reactor under nitrogen atmosphere. Then, n-butyllithium (7.0 mmol) was added to the reactor at 30° C. and reaction was performed while heating adiabatically. Ten minutes after the reaction temperature reached the maximum, butadiene (240 g) and styrene (32 g) were added simultaneously and then reaction was carried out. Ten minutes after the reaction temperature reached the maximum, styrene (64 g) was added and then reaction was carried out. Methanol (6.7 mmol) was added to terminate the reaction and Irganox 1076 and TNPP (0.3 phr each) were added as antioxidant.

GPC analysis revealed that a styrene-butadiene/styrene-styrene block copolymer (A1-(B/A2)-A3) having a weight average molecular weight of 62,000 and a molecular weight distribution (MWD) of 1.024 was prepared. H-NMR revealed a styrene content of 40.2 wt %.

Test Example 1

Physical properties of tapered copolymer

Mechanical properties of the tapered copolymers prepared in Examples and Comparative Examples were measured as follows.

The copolymer was dried on a 120° C. roll mill to a thickness of about 2.1 mm, pressed with a pressure of 80 kgf/cm² for 10 minutes at 150° C. using a 2-mm metal compression mold, and then cooled. After cutting the resulting sheet along the MD direction to prepare a dog bone-shaped specimen, mechanical properties of the tapered copolymer were measured using a universal testing machine (UTM) according to ASTM D412.

DSC analysis of the tapered copolymer was carried out as follows using the Diamond DSC analyzer (Perkin Elmer). The test specimen was placed between aluminum foils and pressed with a pressure of 2 ton to give a disk with a thickness of ~1 mm. After cutting into a circular shape, the specimen was put in an aluminum pan and, after covering, prepared into capsules by pressing. The resulting specimen was subjected to DSC analysis. Analysis condition was as follows. Prior to heating, nitrogen was circulated for 5 minutes at −100° C., in order to remove thermal hysteresis, the specimen was heated at a rate of 20° C./min to 0° C. and kept at the temperature for 2 minutes. Then, after lowering temperature to −100° C. at a rate of 50° C./min and keeping at the temperature for 5 minutes, the specimen was heated to 0° C. at a rate of 10° C./min. $T_g$ was determined by the half Cp extrapolated. The result is summarized in Table 1.

TABLE 1

|  | Ex. 1 | Ex. 2 | Ex. 3 | Ex. 4 | Comp. Ex. 1 | Comp. Ex. 2 |
|---|---|---|---|---|---|---|
| A1:A2:A3 (wt %) | 55:10:35 | 65:10:25 | 75:10:15 | 60:20:20 | 45:10:45 | 40:20:40 |
| $A_1$ block size/$A_3$ block size | 1.6 | 2.6 | 5 | 3 | 1 | 1 |
| Molecular weight (g/mol) | 61,000 | 62,000 | 60,000 | 61,000 | 61,000 | 62,000 |
| Styrene content (wt %) | 40.1 | 39.8 | 40.2 | 40.1 | 40.3 | 40.2 |
| Tensile strength (kgf/cm²) | 340 | 300 | 170 | 240 | 350 | 310 |
| Elongation at brake (%) | 890 | 1010 | 1030 | 990 | 790 | 850 |
| 300% modulus (kgf/cm²) | 45 | 37 | 30 | 34 | 49 | 46 |
| Hardness (Shore A, 5 sec) | 89 | 86 | 79 | 87 | 90 | 87 |
| $T_g$ (° C.) of tapered butadiene block of copolymer | −88.3 | −88.3 | −88.2 | −78.0 | −88.4 | −77.8 |

Test Example 2

Preparation of adhesives

After adding each tapered block copolymer prepared in Examples 1-4 and Comparative Examples 1-2 to a stainless container along with an adhesive resin, a plasticizer and an antioxidant, at compositions described in Table 2, the mixture was stirred for 3 hours while maintaining temperature at 150-160° C. to obtain a completely melt viscous adhesive.

TABLE 2

| Components | Product name | Manufacturer | Contents (parts by weight) |
|---|---|---|---|
| Tapered block copolymer | Examples 1-4, Comparative Examples 1-2 | — | 20 |
| Adhesive resin | Sukorez SU-400 | Kolon | 55 |
| Plasticizer (oil) | White oil 2150 | Michang Oil | 25 |
| Stabilizer | Irganox 1010 | Ciba Specialty Chemicals | 0.5 |

Test Example 3

Physical properties of adhesives

Physical properties of the adhesives prepared in Test Example 2 were measured according to methods commonly employed in the art.

Brookfield viscosity of the adhesive was measured according to ASTM D3236-78 using a rotary viscometer. A specimen was placed in RVTDV-II equipped with Brookfield Thermosel and viscosity was measured by recording torque while rotating the spindle at constant speed in the temperature range of 110-160° C.

Softening point was measured according to ASTM E28 in glycerin. While heating at a rate of 5° C./min, the temperature at which a steel ball placed on the adhesive was forced downward by a distance of 1 inch was measured.

Loop tack was measured according to ASTM D6195 with a loop tack tester, using a 1-inch wide tape specimen in loop shape and a stainless steel plate as the adherend.

180° peel strength was measured by attaching a 1-inch wide tape specimen to a stainless steel plate as the adherend, pressing the tape specimen with a roller at a load of 2 kg by reciprocating once at a speed of 300 mm/min, and measuring the force required to peel one end of the specimen from the adherend with an angle of 180° at a speed of 300 mm/min.

$T_g$ was measured by carrying out DSC analysis in the same manner as in Test Example 1. The result is summarized in Table 3.

TABLE 3

|  |  | Ex. 1 | Ex. 2 | Ex. 3 | Ex. 4 | Comp. Ex. 1 | Comp. Ex. 2 |
|---|---|---|---|---|---|---|---|
| Brookfield | 120° C. | 12,800 | 13,800 | 13,100 | 12,100 | 12,400 | 11,100 |
| viscosity | 140° C. | 4,400 | 4,600 | 4,500 | 4,400 | 4,300 | 4,210 |
| (cps, S31) | 160° C. | 2,150 | 2,290 | 2,250 | 2,200 | 2,100 | 1,990 |
| Softening point (° C.) | | 78.1 | 79.2 | 77.0 | 77.4 | 73.8 | 73.3 |
| Loop tack (g/in) | | 3,480 | 3,550 | 3,360 | 3,460 | 2,850 | 2,970 |
| 180° peel strength (g/in) | | 1,670 | 1,750 | 1,590 | 1,630 | 1,430 | 1,410 |
| $T_g$ (° C.) of adhesive | | −40.7 | −42.5 | −38.5 | −36.6 | −29.1 | −28.2 |

Examples 1-3 and Comparative Example 1 are compared in Table 3 for the same molecular weight and taper content. The adhesives using the asymmetric tapered copolymers exhibited comparable viscosity but significantly improved softening point, loop tack and 180° peel strength, when compared to those using the symmetric tapered copolymers. Also, in Example 4 and Comparative Example 2, wherein the tapered styrene content was increased, the asymmetric tapered copolymer showed better adhesion properties.

Usually, a hot melt adhesive having lower $T_g$ has improved tack and adhesion. When an adhesive resin with high $T_g$ is combined with a styrene-based elastomer of the same amount, the resulting $T_g$ differs depending on the compatibility. A lower $T_g$ results in better wetting property and, hence, better adhesion properties are attained. As seen from Table 3, the asymmetric copolymers have lower $T_g$ than the symmetric copolymers, which is consistent with the adhesion property measurement results.

The disclosed tapered block copolymer has very superior adhesion properties such as loop tack, 180° peel strength and softening point as compared to the existing styrene-based copolymers and may be used to prepare high-quality hot melt adhesives for industrial use.

The present invention has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A tapered block copolymer consisting of a compound represented by Chemical Formula 1:

$$A_1\text{-}(A_2/B)\text{-}A_3 \qquad (1)$$

wherein $A_1$ and $A_3$ are vinyl aromatic block polymers; $A_2$ is a vinyl aromatic monomer; B is a conjugated diene monomer; $(A_2/B)$ is a tapered block copolymer copolymerized from $A_2$ and B; and the block size of $A_1$ is different from that of $A_3$, wherein a ratio of the block sizes of $A_3$ and $A_1$ is 1:1.1-8, and the block copolymer has a weight average molecular weight from 10,000 to 100,000.

2. The tapered block copolymer according to claim 1, wherein the proportion of $A_2$ is 5-50 wt % of the total vinyl aromatic monomers $(A_1+A_2+A_3)$.

3. The tapered block copolymer according to claim 1, wherein the vinyl aromatic monomer is selected from the group consisting of styrene, α-methylstyrene, p-methylstyrene, o-methylstyrene, p-tert-butylstyrene, dimethylstyrene, vinyltoluene, vinylxylene, diphenylethylene and vinylnaphthalene.

4. The tapered block copolymer according to claim 1, wherein the vinyl aromatic polymer is a polymer or a copolymer of monomers selected from the group consisting of styrene, α-methylstyrene, p-methylstyrene, o-methylstyrene, p-tert-butylstyrene, dimethylstyrene, vinyltoluene, vinylxylene, diphenylethylene and vinylnaphthalene.

5. The tapered block copolymer according to claim 1, wherein the conjugated diene monomer is butadiene, isoprene or a mixture thereof.

6. The tapered block copolymer according to claim 1, wherein the content of the vinyl aromatic monomers in the block copolymer is 5-95 wt %.

7. An adhesive composition comprising the tapered block copolymer according to claim 1.

8. The adhesive composition according to claim 7, which comprises the tapered block copolymer, an adhesive resin, a plasticizer and a stabilizer.

9. The adhesive composition according to claim 7, which comprises 100 parts by weight of the tapered block copolymer, 100-400 parts by weight of an adhesive resin, 10-200 parts by weight of a plasticizer and 0.1-10 parts by weight of a stabilizer.

10. A method for preparing a tapered block copolymer consisting of a compound represented by Chemical Formula 1, comprising:
polymerizing a vinyl aromatic monomer $(A_1)$ in an inert organic solvent using a single organolithium initiator;
upon completion of the polymerization, adding a conjugated diene monomer and a vinyl aromatic monomer $(A_2)$ together and performing polymerization; and
adding a vinyl aromatic monomer $(A_3)$ and performing polymerization, and then deactivating the active terminals of polymers using a polymerization terminator:

$$A_1\text{-}(A_2/B)\text{-}A_3 \qquad (1)$$

wherein $A_1$ and $A_3$ are vinyl aromatic block polymers; $A_2$ is a vinyl aromatic monomer; B is a conjugated diene monomer; $(A_2/B)$ is a tapered block copolymer copolymerized from $A_2$ and B; and the block size of $A_1$ is different from the block size of $A_3$, and wherein a ratio of the block sizes of $A_3$ and $A_1$ is 1:1.1-8, and the block copolymer has a weight average molecular weight from 10,000 to 100,000.

11. The method for preparing a tapered block copolymer according to claim 10, wherein a molar ratio of the vinyl aromatic monomer $(A_1)$ to the vinyl aromatic monomer $(A_3)$ or a molar ratio of the vinyl aromatic monomer $(A_3)$ to the vinyl aromatic monomer $(A_1)$ is 1:1.1-8.

12. The method for preparing a tapered block copolymer according to claim 10, wherein the proportion of $A_2$ is 5-50 wt % of the total vinyl aromatic monomers $(A_1+A_2+A_3)$.

13. The method for preparing a tapered block copolymer according to claim 10, wherein tetrahydrofuran, diethyl ether, diethylene glycol dimethyl ether, N,N,N',N'-tetramethylethylenediamine, triethylamine or a mixture thereof is added in said polymerizing the vinyl aromatic monomers $A_1$, $A_2$ and $A_3$.

14. The method for preparing a tapered block copolymer according to claim 10, wherein the inert organic solvent is hexane, heptane, cyclohexane, benzene or toluene.

15. The method for preparing a tapered block copolymer according to claim 10, wherein the organolithium initiator is n-butyllithium or sec-butyllithium.

16. The method for preparing a tapered block copolymer according to claim 10, wherein the polymerization terminator is water, an alcohol, an organic or inorganic acid, or a halogenated Group 4 compound.

* * * * *